Patented Oct. 4, 1949

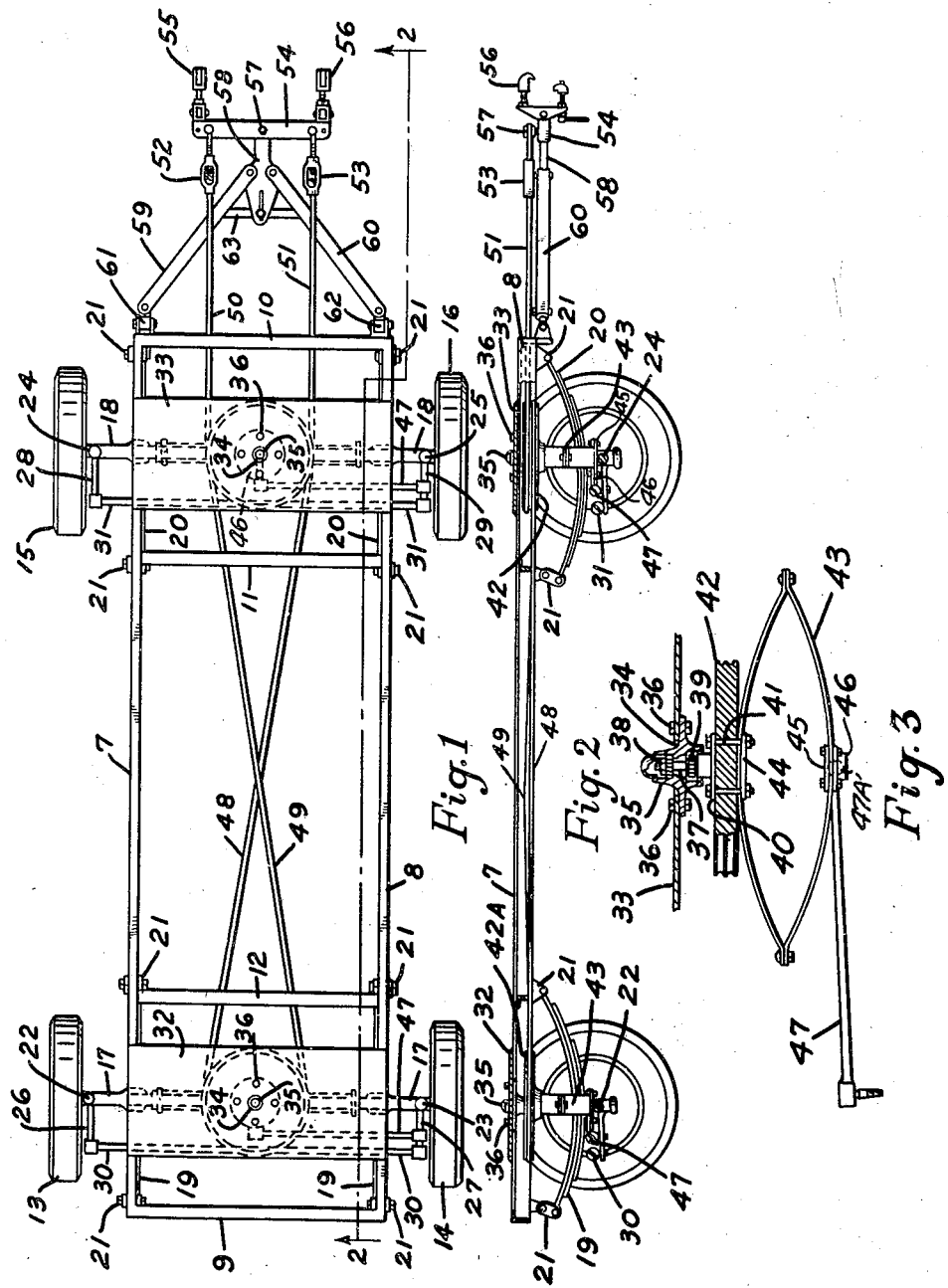

2,483,684

UNITED STATES PATENT OFFICE 2,483,684

FOUR-WHEEL TRAILER

Chester Williams, Ypsilanti, Mich., assignor of fifty per cent to Marvin Ray Hannum and fifty per cent to John Sherrod De Tar, both of Milan, Mich.

Application March 29, 1946, Serial No. 658,263

1 Claim. (Cl. 280—102)

This invention relates to automobile trailers, and has particular reference to a four wheel trailer.

An object of the invention is the provision of a four wheel trailer which has positive steering on all four wheels.

Another object of the invention is the provision of a four wheel trailer which is constructed and arranged to prevent whipping and jack knifing.

Another object of the invention is the provision of a four wheel trailer with steering mechanism adapted to cause the wheels of the trailer to align themselves.

Another object of the invention is the provision of a device of the character indicated which is constructed and arranged in such manner as to provide flexibility of attachment to the towing vehicle.

Another object of the invention is the provision of a device of the character indicated which permits the trailer to be turned within a comparatively small radius.

Another object of the invention is the provision of a four wheel trailer which provides positive backing.

Another object of the invention is the provision of a four wheel trailer which is constructed and arranged to provide a high safety factor when being towed at high speeds.

The foregoing and other objects and advantages of the invention will become more apparent as the description proceeds, reference being made from time to time to the accompanying drawings, forming part of the within disclosure, in which drawings:

Fig. 1 is a plan view of a device embodying my invention.

Fig. 2 is a section taken substantially on the line 2—2 of Fig. 1.

Fig. 3 is an enlarged fragmentary detail partly in section showing the pulley mountings and drag links.

Referring now more particularly to the drawings, it will be understood that in the embodiment herein disclosed, the reference characters 7, 8, 9, 10, 11 and 12 indicate the members comprising the trailer frame, which is mounted on the wheels 13, 14, 15 and 16 through the axles 17 and 18, rear springs 19, front springs 20, and the spring supports 21.

The wheels 13, 14, 15 and 16 are supported on spindles which pivot on the axles 17 and 18, as at 22, 23, 24 and 25. The spindles are provided with spindle arms 26, 27, 28 and 29. The rear spindle arms 26 and 27 are connected by a tie rod 30, and the front spindle arms 28 and 29 are connected by a tie rod 31, so that the front and rear wheels move in pairs.

Secured to the top of the frame members 7 and 8 above and in alignment with the axles 17 and 18, respectively, are bed plates 32 and 33 which are adapted to support elements of the steering mechanism as hereinafter described. The bed plate 33 has a central opening 34 (Fig. 3) adapted to accommodate one end of a hub 35, which is bolted beneath the plate 33, as at 36. A spindle 37 is adapted to rotate in the hub 35 on suitable bearings 38 and 39. The lower end of the spindle 37 is provided with a flange 40, to which is bolted, as at 41, a pulley 42.

A pair of elliptical transfer springs 43 are secured to the underside of the pulley 42 by means of shackles 44, through which the bolts 41 extend. Secured to the lower spring 43 is a bracket 45 having a socket extension arm 46 which is adapted to accommodate a ball 47A secured to one end of the drag link 47, the latter being pivotally connected at the other end to the spindle arm 29. A similar assembly is mounted to the bed plate 32 except that the rear pulley 42A has a single groove instead of a double groove as provided in the front pulley 42.

It will be understood therefore, that the front and rear wheels are moved in pairs through the rotation of the pulleys 42 and 42A and the elliptical springs 43, and the movement of the drag links 47.

It will also be understood that with this combination and arrangement of elements, the trailer frame is free to move up and down on the springs 19 and 20 without interfering with the steering mechanism which is also provided with flexibility through the transverse elliptical springs 43. The springs 43 permit the frame and the steering mechanism to move up and down with the springs 19 and 20, and yet provide a positive steering action without the use of splines on the spindles 37.

Crossed cables 48 and 49 are secured to the pulleys 42 and 42A so that the latter may rotate in opposite directions, causing the front and rear wheels to move correspondingly so that the trailer will automatically track the towing vehicle.

Cables 50 and 51 are secured to the front pulley 42, and to turn buckles 52 and 53, which are in turn secured to a draw beam 54 which is adapted to be secured by means of universal clamps 55 and 56 to the bumper of a towing vehicle. The draw beam 54 is pivoted, as at 57, to a member 58. Diverging arms 59 and 60 connect the member 58 to the trailer frame by means of the clevises 61 and 62. An adjustable cross arm 63 serves as a brace between the diverging arms 59 and 60.

With the structure just described, it will be seen that the angular displacement between the towing unit and the trailer causes the draw beam 54 to pivot about the point 57, and inasmuch as the draw beam is rigidly attached to the bumper of the towing unit, the cables 50 and 51 transmit this reaction to the pulley 42 and oppositely to the pulley 42A. The pulleys in turn transmit the motion to the elliptical springs 43, and the drag links 47 to the tie rods 30 and 31 which steer the wheels.

Having described my invention, what I claim and desire to secure by Letters Patent is:

In a device of the character described, including a trailer frame, axles resiliently mounted to said trailer frame, and pairs of wheels pivotally mounted on each axle, the combination of transverse bed plates secured to said frame above said axles, each bed plate having a central opening adapted to accommodate a hub, a hub secured to each bed plate, a spindle rotatably mounted in each hub, a pulley mounted for rotation with each of said spindles, a pair of elliptical springs secured to the underside of each pulley, a drag link secured to an arm secured to the underside of each pair of elliptical springs, each of said drag links being adapted to pivot a pair of wheels, and crossed cables connecting one of said pulleys to said other pulley.

CHESTER WILLIAMS.

REFERENCES CITED

The following references are of record in the file of this patent:

UNITED STATES PATENTS

| Number | Name | Date |
|---|---|---|
| 1,470,328 | Nabors | Oct. 9, 1923 |
| 1,568,417 | Rhenbottom | Jan. 5, 1926 |
| 1,925,712 | Cambell | Sept. 5, 1933 |
| 2,206,991 | Williams et al. | July 7, 1940 |

FOREIGN PATENTS

| Number | Country | Date |
|---|---|---|
| 5,983 | Great Britain | Mar. 12, 1906 |